US007454404B2

(12) United States Patent
Dettinger et al.

(10) Patent No.: US 7,454,404 B2
(45) Date of Patent: Nov. 18, 2008

(54) METHOD OF ADDRESSING QUERY SCHEDULING AND SYSTEM RESOURCE REQUIREMENTS

(75) Inventors: Richard D. Dettinger, Rochester, MN (US); Daniel P. Kolz, Rochester, MN (US); Shannon E. Wenzel, Colby, WI (US)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 10/787,477

(22) Filed: Feb. 26, 2004

(65) Prior Publication Data

US 2005/0192997 A1    Sep. 1, 2005

(51) Int. Cl.
*G06F 7/00* (2006.01)
*G06F 17/30* (2006.01)
*G06F 12/00* (2006.01)
*G06F 3/048* (2006.01)

(52) U.S. Cl. .............................. 707/2; 707/3; 707/200; 715/810; 715/825

(58) Field of Classification Search ................... 707/10, 707/101, 3, 100, 2, 200; 715/810, 825
See application file for complete search history.

(56) References Cited

U.S. PATENT DOCUMENTS

| 6,366,915 B1* | 4/2002 | Rubert et al. ................. 707/10 |
| 6,725,227 B1 | 4/2004 | Li |
| 7,096,219 B1* | 8/2006 | Karch ........................... 707/9 |
| 2003/0172082 A1* | 9/2003 | Benoit et al. ................ 707/101 |
| 2005/0125427 A1* | 6/2005 | Dageville et al. ........... 707/100 |

* cited by examiner

*Primary Examiner*—Don Wong
*Assistant Examiner*—Patrick A Darno
(74) *Attorney, Agent, or Firm*—Patterson & Sheridan, LLP

(57) ABSTRACT

Method, system and article of manufacture for scheduling queries. In particular, the scheduling options made available to a user for a particular unit of work are determined dynamically at the time of scheduling. In this way, the execution cost, for example, of a particular unit of work can be taken into account when determining which scheduling options to make available. In addition, or alternatively, system availability and/or user parameters may be accounted for when determining which scheduling options to make available.

17 Claims, 6 Drawing Sheets

200

USER: J_SMITH
QUERY: UNSET*

DATE IS MON OCT 06 05:18:05 CDT 2003

Schedule Batch Operation

NAME: | QUICK INEXPENSIVE QUERY | ← 202

DESCRIPTION: | THERE SHOULD BE A LOT OF OPTIONS FOR THIS ONE... | ← 201

FREQUENCY: | ONCE (NOW) |
ONCE (NOW)
ONCE (SCHEDULED)
HOURLY
DAILY ← 206
WEEKLY
MONTHLY

USER: J_SMITH
QUERY: UNSET*

DATE IS MON OCT 06 05:18:05 CDT 2003

Schedule Batch Operation

NAME: QUICK INEXPENSIVE QUERY

DESCRIPTION: THERE SHOULD BE A LOT OF OPTIONS FOR THIS ONE...

FREQUENCY: MONTHLY

_302_

SCHEDULE QUERY – MONTHLY RUN

START:
  DATE: 2003-10-06
  TIME: 05:18:05

END:
● NUMBER OF OCCURRENCES TO SCHEULDE: 1
○ DATE:

_304_
OK    CANCEL

USER: J_SMITH
QUERY: UNSET*

DATE IS MON OCT 06 05:18:05 CDT 2003

Schedule Batch Operation

NAME: LONG EXPENSIVE QUERY

DESCRIPTION: THIS QUERY CANNOT BE LET RUN TOO OFTEN...

FREQUENCY: MONTHLY

---

SCHEDULE QUERY – MONTHLY RUN

START:
  DATE: 2003-10-06
  TIME: 05:18:05

END:
  ◉ NUMBER OF OCCURRENCES TO SCHEULDE: 1
  ○ DATE:

---

ALERT! THE ESTIMATED EXPENSE OF RUNNING THIS QUERY IS IN EXCESS OF WHAT CAN BE DONE DURING NORMAL BUSINESS HOURS. THIS QUERY MAY ONLY BE SCHEDULED FOR EVENING AND WEEKEND TIMES! — 502

304
[ OK ]  [ CANCEL ]

*FIG. 5*

METHOD OF ADDRESSING QUERY SCHEDULING AND SYSTEM RESOURCE REQUIREMENTS

BACKGROUND OF THE INVENTION

1. Field of the Invention

The present invention generally relates to data processing, and more particularly, to scheduling the performance of units of work in a data processing system.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level query languages, such as the Structured Query Language (SQL). The term "query" denominates a set of commands that cause execution of operations for processing data from a stored database. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database.

In some environments, it is desirable to schedule queries. Scheduling queries allows users to specify specific times and/or frequencies for running queries. Query schedules are appropriate in environments where the underlying data is constantly changing (i.e., being updated or augmented with additional data). For example, a researcher runs one query to get an initial list of candidates for a research study to start the research process. But over the coming weeks to years, the researcher wants to know if other people develop conditions that would satisfy the query and therefore make them candidates for similar research. Similarly, summary tables or normalized values might be periodically updated via expensive SQL operations. Thus, some classes of queries are scheduled to be run multiple times over long periods of time.

While the ability to schedule queries is a useful tool for users, indiscriminate scheduling can result in substantial system performance degradation. Left in isolation, a scheduled system can easily tend towards chaos. As more queries get scheduled, the system's performance becomes more unpredictable. It is common to deal with this situation by having an administrator determine why the system has become unresponsive and selectively terminate queries identified as being problematic. Alternatively, to prevent any one user or group of users from destabilizing a system, query execution limits are often placed on users. For example, a specific user(s) may be limited to running queries that take less than 20 minutes to run, or is not allowed to run queries that can consume more than 20% of the CPU power at a time. Typically, these rules are administrative actions enforced at runtime and commonly the action taken is to terminate any offending query.

The problem with the foregoing approach is that the users/administrators of a system have to recover from the system action. The ramifications include lost time too late in the process, frustration on the part of users, and lost profits by the system owner who is likely paying the users running the queries. Therefore, what is needed is a more intelligent approach to scheduling units of work, such as queries.

SUMMARY OF THE INVENTION

The present invention generally provides for methods, systems and articles of manufacture for scheduling queries.

In one embodiment, methods, systems and articles of manufacture for scheduling execution of units of work is provided. A cost to execute a unit of work is determined. On the basis of the cost, a plurality of user-selectable scheduling options for future execution of the unit of work can be determined. The plurality of user-selectable scheduling options are then returned to a user interface for display to a user.

In another embodiment, scheduling units of work includes determining a cost to execute a unit of work; determining system availability to execute the unit of work; and determining a plurality of user-selectable scheduling options for further execution of the unit of work on the basis of the cost and at least one of system availability and user rules. The plurality of user-selectable scheduling options are then returned to a user interface for display to a user.

In another embodiment, a computer system includes a schedule indicating when units of work are to be executed and a scheduler. The scheduler is configured to determine a cost to execute a unit of work; determine a plurality of user-selectable scheduling options for future execution of the unit of work on the basis of the cost; and return the plurality of user-selectable scheduling unit of work to a user interface for display to a user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is an interface screen for scheduling queries on the basis of scheduling options available from a drop-down menu.

FIG. 3 is a scheduling interface screen displayed to a user after selecting a scheduling option from a drop-down menu of the interface screen of FIG. 2.

FIG. 5 is an interface screen corresponding to screen shown in FIG. 3, wherein a text message alerts the user to a scheduling restriction for the query being scheduled.

DETAILED DESCRIPTION OF THE PREFERRED EMBODIMENTS

Figure 1:
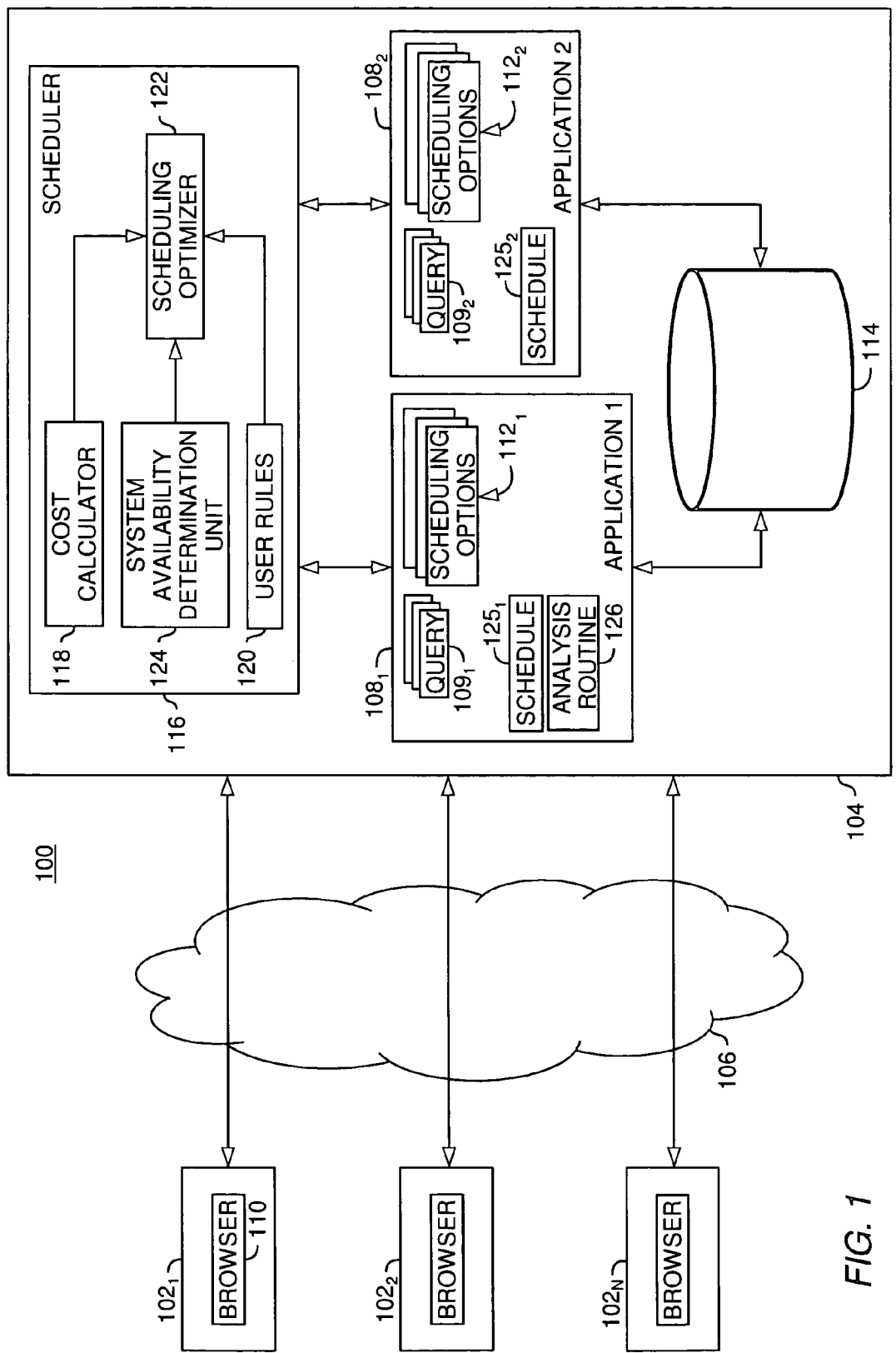
FIG. 1 is a data processing environment having a scheduler configured to determine which scheduling options to make available to users of applications.

The present invention is directed to a method, system and article of manufacture for scheduling queries. In particular, the scheduling options made available to a user for a particular unit of work are determined dynamically at the time of scheduling. In this way, for example, the execution cost for a particular unit of work can be taken into account when determining which scheduling options to make available.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) non-writable storage media (e.g., read-only memory devices within a computer such as CD-ROM disks readable by a CD-ROM drive) having information permanently stored thereon; and (ii) writable storage media (e.g., floppy disks within a diskette drive or hard-disk drive) having alterable information stored thereon. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

In some embodiments, the invention can be implemented in a hardware/software configuration including at least one client computer and at least one server computer. The client(s) and server(s) may be executing on a common machine or may be deployed in distributed environment in which the client(s) and server(s) communicate via a network. In a particular embodiment, aspects of the invention are implemented in a web-based environment. However, the client-server model and web-based environment are merely representative models/environments in which the present invention may be implemented, and persons skilled in the art will recognize other possibilities. Furthermore, embodiments of the present invention can apply to any comparable hardware configuration, regardless of whether the computer systems are complicated, multi-user computing apparatus, single-user workstations, or network appliances that do not have non-volatile storage of their own.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

Referring now to FIG. 1, a block diagram of one embodiment of a data processing system 100 is illustrated. Illustratively, the data processing system 100 is a networked environment in which a plurality of client computers $102_1, 102_2 \ldots 102_N$ access a server computer 104 via a network 106. In one embodiment, the network 106 is the Internet and the server computer 104 is a web-based server hosting any number of applications; by way of example, two applications $108_1$ and $108_2$ (collectively, the applications 108) are shown on the server computer 104. Accordingly, the client computers 102 may each be configured with a browser application 110 capable of navigating to the network address of the server computer 104 and submitting user requests to the applications 108. For purposes of the present illustration, the applications 108 are considered to be database applications configured to externalize graphical user interface elements for the construction, scheduling and submission of queries $109_{1-2}$. The queries may then be executed against a database 114, which may be any queryable collection of data and may reside on the server computer 104, remotely on another computer or be distributed over a plurality of networked computers. In addition to allowing users to construct queries, the applications 108 may also include analysis routines 126. For example, an analysis routine may run through a group of text documents, annotating interesting information that would later be cross referenced by search engines. Another analysis routine may be configured to generate a complex three dimensional model display of data points. More generally, an analysis routine may refer to any unit of work performed with respect to the data in the database 114, or results derived from the data in the database 114.

More generally, the applications 108 may be configured to allow implementation of any unit of work, of which queries and analysis routines are merely examples. Accordingly, while reference is made herein to queries and/or analysis routines the invention is not so limited.

A user accessing the database applications 108 via the browser 110 is presented with an interface screen which makes available to the user a plurality of scheduling options $112_{1-2}$. After selecting the desired scheduling options, a resulting schedule entry is made to a schedule $125_{1-2}$ that is maintained by the respective application 108. Subsequently, the scheduled unit of work (e.g., query or analysis routine) is run in accordance with the schedule $125_{1-2}$.

A representative scheduling interface 200 output by either of the applications 108 is shown in FIG. 2. By way of example, the scheduling interface 200 is configured for scheduling the execution of queries. However, persons skilled in the art will recognize that the scheduling interface 200 is equally adaptable to scheduling other units of work, such as the execution of an analysis routine. The scheduling interface 200 includes a name field 202 for specifying the name of a query, and a description field 204 for specifying a brief description of the query. The scheduling interface 200 also includes a list of scheduling options (e.g., scheduling options 112) made available to the user in the form of a drop-down menu 206. Illustratively, the drop-down menu 206 provides the user with six scheduling options. With the exception of the first scheduling options (which the user selects for immediate execution of the query) the remaining five scheduling options require the user to specify additional scheduling parameters. Illustratively, it is assumed the user selected "Monthly" from screen 200 as the frequency for running the query and then clicks the OK button 208 to advance to a next screen for specifying additional parameters. One such interface screen 300 is shown in FIG. 3. The screen 300 includes a schedule configuration area 302 in which the user may specify starting and ending parameters for running the query. For example, the starting parameters include the date and time of day, and the ending parameters include the number of occurrences to schedule. Upon completing the schedule configuration process, the user clicks the OK button 304 to submit the schedule. The query is then run on the basis of the schedule without further user interaction.

Figure 4:
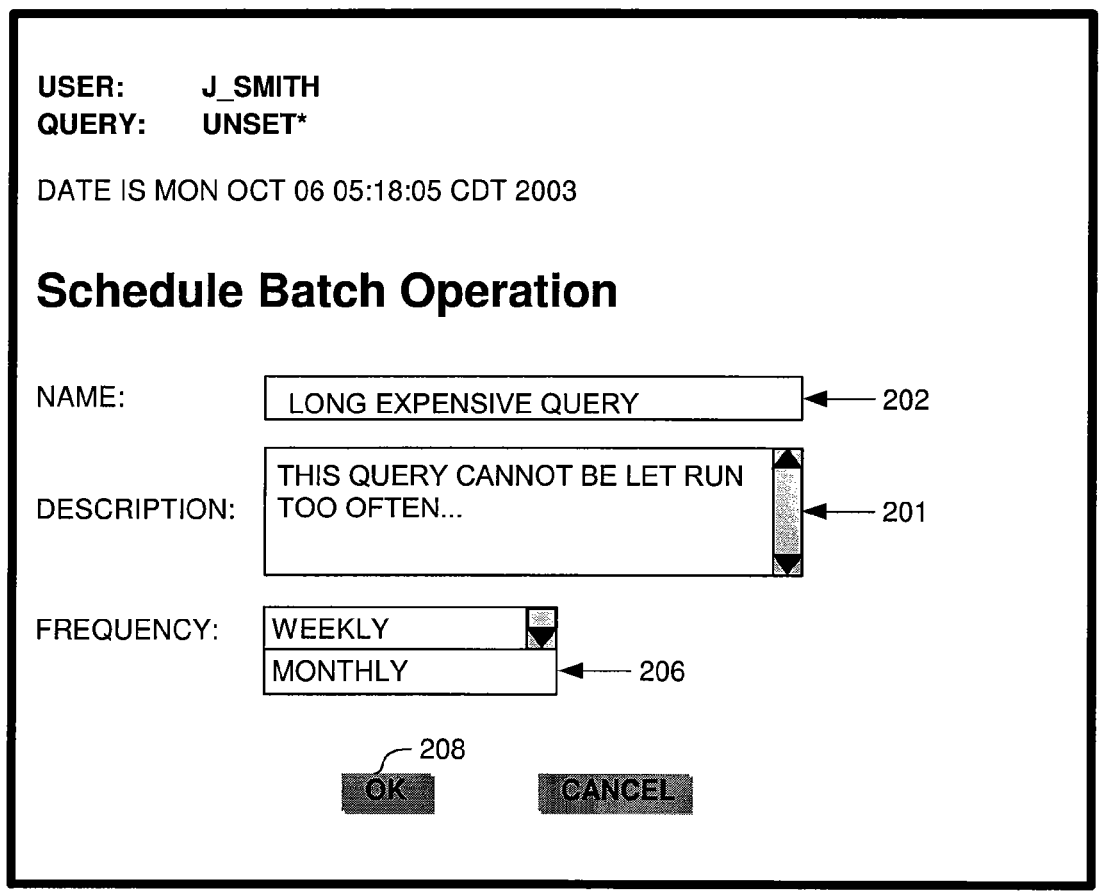
FIG. 4 is an interface screen corresponding to screen shown in FIG. 2, wherein the list of available scheduling options is restricted.

While any given application may allow for a broad range of scheduling options, the system performance may be optimized by restricting users to a subset of all available scheduling options. For example, FIG. 4 shows an interface screen 400 corresponding to the interface screen 200, except that the list of available scheduling options in the dropdown menu 206 has been reduced. In particular, the user is now only given "Weekly" and "Monthly" as the available scheduling options. It is contemplated that the available scheduling options may be determined on the basis of a variety of factors including, for example, the cost to execute the query, the system availability and/or user rules, as will be described in more detail below. Assume that the user again selects "Monthly" as the frequency for running the query and then clicks the OK button 208 to advance to a next screen for specifying additional parameters. One such interface screen 500 is shown in FIG. 5 and corresponds to the screen 300 shown in FIG. 3. In general, the screen may be augmented with information describing restrictions about running the query (e.g., restrictions on running the query during business hours). In this example, the screen 500 includes a text message 502 indicating to the user that the scheduling options are restricted to off-peak hours because of the determined execution cost. The text message is merely illustrative of one manner of conveying to the user a limitation on scheduling options. Persons skilled in the art will recognize other embodiments within the scope of the invention.

In one embodiment, the scheduling options made available to a user for a given unit of work are determined by a scheduler 116, such as the one shown residing on the server computer 104 in FIG. 1. Although not shown, the scheduler 116 may be configured with appropriate application programming interfaces (APIs) for each of the applications 108. In this way, the scheduler 116 may interface with the applications 108 and operate to limit the scheduling options externalized by the respective applications, as was illustrated with respect FIGS. 2-5.

The component of the scheduler 116 responsible for determining scheduling options for a given unit of work is a scheduling optimizer 122. In general, the scheduling optimizer 122 is configured to take input and then determine which of the scheduling options $112_{1-2}$ of the various applications 108 are to be externalized for selection by users. Illustrative inputs to the optimizer 122 include the cost of a query, calculated by a cost calculator 118, and the system availability, calculated by a system availability determination unit 124. In one embodiment, user rules 120 are also employed to determine scheduling options. Persons skilled in the art will recognize that other parameters may be relied upon to determine scheduling options. It should be noted that the scheduling architecture shown in FIG. 1 is merely one embodiment. In another embodiment, each application may be configured with a scheduler capable of determining which scheduling options to make available to users for a given unit of work. It is also contemplated that the scheduling options 112 need not be statically defined, but may instead be dynamically generated by the respective application.

Figure 6:
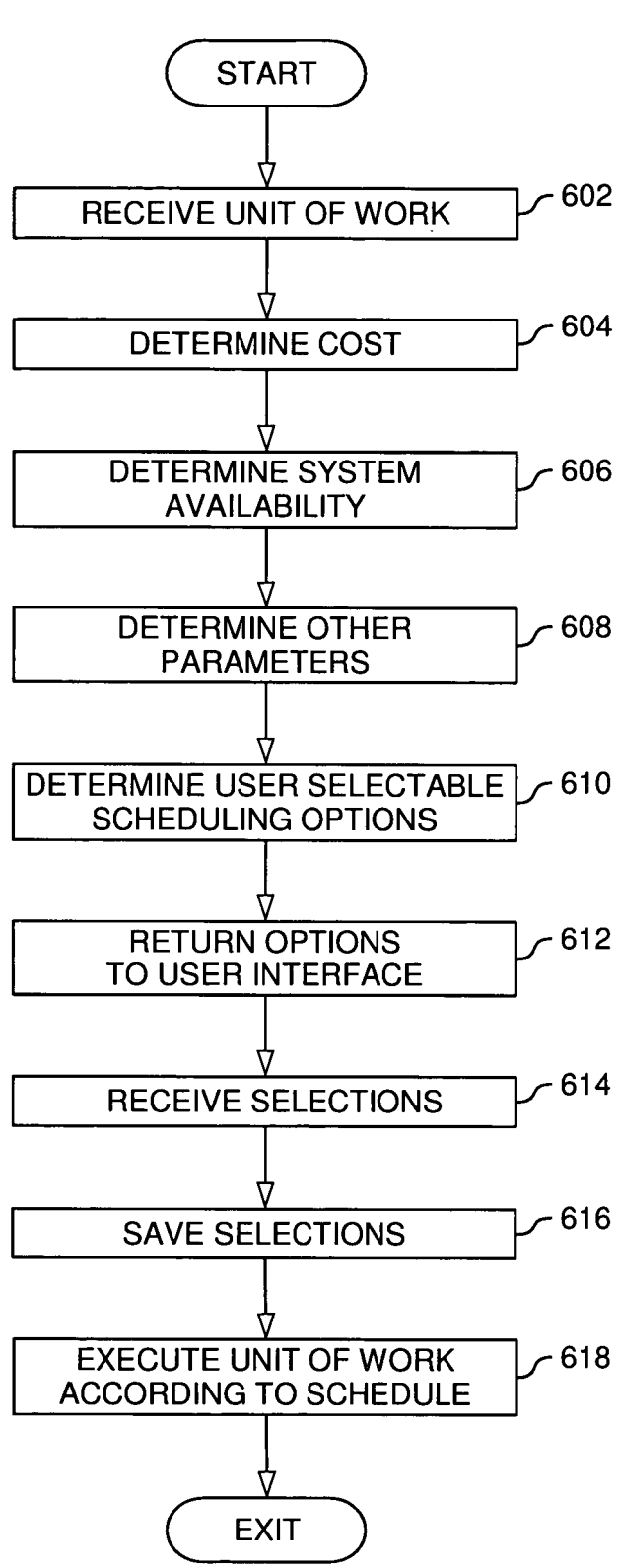
FIG. 6 is a flowchart illustrating a scheduling routine.

Referring now to FIG. 6, one embodiment of a scheduling routine 600 is shown. The scheduling routine 600 is collectively implemented by the scheduler 116 and an application (e.g., any of the applications 108 shown in FIG. 1). Initially, a unit of work is received (step 602). For example, a user may construct a query using a graphical user interface made available by an application. The cost calculator 118 of the scheduler 116 is then invoked to determine a cost of executing the query (step 604). In one embodiment, the system availability determination unit 124 is then invoked to determine system availability (step 606). In addition to cost and system availability is contemplated that the scheduling optimizer 122 may rely on other input in determining which scheduling options to make available to a user for a given unit of work. Accordingly, the scheduling routine 600 includes a determination of other parameters affecting the available scheduling options (step 608). The scheduling optimizer 122 then determines the user-selectable scheduling options (step 610) and returns those options to a user interface (step 612), such as the one shown in FIG. 4. The user is then able to make and submit scheduling options selections. The user selections are received (step 614) and saved in an appropriate schedule (step 616), such as one of the schedules 125 shown in FIG. 1. When the selected scheduling selections are met, the unit of work is performed (step 618).

Regarding determination of cost, it is noted that it is well-known to estimate the execution cost of queries, even where the queries were not previously run. Query optimizers and query expense estimation tools exist for this purpose. Given any particular query, it is possible to predictively estimate how long it will take to run, with a reasonable degree of accuracy. How long a query will take to run is determined by a number of factors (that can be discovered relatively quickly) related to how the system is going to have to execute the query. Illustrative factors include what indexes are in place for the query, what joins will have to be executed, the expected distribution of data that will come from each table used in the query, etc.

As noted above, user rules 120 (FIG. 1) may be applied to determine which scheduling options to make available. One user rule may require accounting for a given user's other scheduled units of work. For example, if a user that wants to execute a 2 hour query at 2 A.M., but already has three long-running queries scheduled for that time, the option to schedule another can be disallowed. In such a model, it is contemplated to use a display (e.g., made available by the scheduler 116) which highlights to users their scheduling options on the basis of what is already scheduled. Thus, times of day might be blocked out, and potentially differentiated by the different reasons they are blocked out. Illustrative reasons for blockage include core business hours, queries the user already has scheduled, and queries others have scheduled. In this way, a user viewing the display could choose to not run a given scheduled query(s) in favor of the one currently being scheduled, or may opt to move a scheduled query to another time to free up a time block. Thus, users have the advantage of intelligently prioritizing and scheduling. Of course, scheduled queries can overlap and run concurrently, but any potential detrimental cumulative effect would be accounted for by restricting scheduling options. It is also contemplated that some users would be given priority over other users, allowing the higher priority users to move the queries of other lower priority users to a different time (or remove it from the schedule entirely) to free up the resources to run their queries.

While the execution cost may be an estimation/prediction where the unit of work was not previously run, it is also contemplated that historical execution time(s) may be relied upon where the unit of work was previously performed. Thus, the scheduler 116 may have access to historical information for units of work and use this information to determine the cost. Further, it is contemplated that both cost determination approaches (estimation and history-based) may be used in tandem.

In any case, the execution cost (and other inputs to the scheduler 116) can be used to determine what options to provide a user during the scheduling process. By preemptively accounting for the cost of units of work before scheduling the unit of work, system performance degradation may be mitigated or avoided. For example, if a determination is made that a query is relatively inexpensive, it may be acceptable to run the query every minute. On the other hand, if a system recognizes that a query is going to be a significant drain on the system, the user may be restricted to running the query only once per week. Further, if a system predictively determines a query is never going to be allowed to complete in during business hours, and thus requires off hours execution, the scheduler 116 may eliminate any options allowing business hours execution. Such an approach yields advantages system-wide in that the system remains more usable and predictable to other users and the administrator can expect fewer instances requiring intervention.

While the foregoing is directed to embodiments of the present invention, other and further embodiments of the invention may be devised without departing from the basic scope thereof, and the scope thereof is determined by the claims that follow.

What is claimed is:

1. A computer-implemented method for scheduling execution of units of work, comprising:
    determining a first cost to execute a first unit of work;
    determining a first set of user-selectable scheduling options for future execution of the first unit of work based on the first cost, wherein the first set of user-selectable scheduling options is a subset of a larger set of scheduling options, wherein the larger set of scheduling options is stored on a computer readable storage medium and includes a plurality of user-selectable time criteria and frequency criteria, wherein the time criteria specifies when the execution of a given unit of work will begin and the frequency criteria specifies how frequently the given unit of work will be executed;
    returning the first set of user-selectable scheduling options to a user interfaces for display, whereby the user interface presents:
        time criteria selection elements from which a user specifies a time at which execution of the first unit of work will begin; and
        frequency at which the first unit of work will be executed beginning at the specified time;
    determining a second cost to execute a second unit of work;
    determining a second set of user-selectable scheduling options for future execution of the second unit of work based on the second cost, wherein the second set of user-selectable scheduling options is a subset of the larger set of scheduling options, and wherein the second set of user-selectable scheduling options is different than the first set of user-selectable scheduling options; and
    returning the second set of user-selectable scheduling options to a user interface for display, whereby the user interface presents:
        time criteria selection elements from which a user specifies a time at which execution of the second unit of work will begin; and
        frequency criteria selection elements from which the user specifies a frequency at which the second unit of work will be executed beginning at the specified time.

2. The method of claim 1, wherein at least one of the first and second units of work is a query.

3. The method of claim 1, wherein at least one of the first and second units of work is an analysis routine.

4. The method of claim 1, further comprising displaying the returned first and second sets of user-selectable scheduling options via a menu in the user interface.

5. The method of claim 1, further comprising, for each of the first and second sets of user-selectable scheduling options:
    receiving a user selection from the respective set of user-selectable scheduling options; and
    storing a schedule for the respective unit of work on the basis of the user selection.

6. The method of claim 1, further comprising, for each of the first and second sets of user-selectable scheduling options:
    receiving a user selection from the respective set of user selectable scheduling options;
    storing a schedule for the respective unit of work on the basis of the user selection; and
    repetitively executing the respective unit of work on the basis of the schedule.

7. The method of claim 1, wherein determining the first and second costs to execute the first and second units of work, respectively, comprises estimating a respective time required to execute the respective unit of work.

8. The method of claim 1, wherein determining the first and second costs to execute the first and second units of work is done on the basis of historical query execution times for previous executions of the respective units of work.

9. The method of claim 1, wherein determining the first and second sets of user-selectable scheduling options comprises:
    determining user parameters specific to a user; and
    determining the respective set of user-selectable scheduling options for future execution of the respective unit of work on the basis of the respective cost and the user parameters.

10. The method of claim 9, wherein the user parameters include at least one of a user status of the user and other units of work already scheduled for execution by the user.

11. The computer-implemented method of claim 1, wherein:
    the first cost to execute the first unit of work is higher than the second cost to execute the second unit of work; and
    the first set of user-selectable scheduling options is less than the second set of user-selectable scheduling options.

12. A computer-implemented method for scheduling units of work, comprising:
    determining a first cost to execute a first unit of work;
    determining system availability to execute the first unit of work; determining a first set of user-selectable scheduling options for future execution of the first unit of work on the basis of the first cost and the system availability, wherein the first set of user-selectable scheduling options is a subset of a larger set of scheduling options, and wherein the larger set of scheduling options is stored on a computer readable storage medium and includes a plurality of user-selectable time criteria and frequency criteria, wherein the time criteria specifies when the execution of a given unit of work will begin and the frequency criteria specifies how frequently the given unit of work will be executed;

returning the first set of user-selectable scheduling options to a user interface for display, whereby the user interface presents:

time criteria selection elements from which a user specifies a time at which execution of the first unit of work will begin; and frequency criteria selection elements from which the user specifies a frequency at which the first unit of work will be executed beginning at the specified time;

determining a second cost to execute a second unit of work;

determining a system availability to execute a second unit of work;

determining a second set of user-selectable scheduling options for future execution of the second unit of work on the basis of the second cost and the system availability, wherein the first set of user-selectable scheduling options is a subset of the larger set of scheduling options, and wherein the second set of user-selectable scheduling options is different than the first set of user-selectable scheduling options; and returning the second set of user-selectable scheduling options to a user interface for display, whereby the user interface presents:

time criteria selection elements from whicha user specifies a time at which execution of the second unit of work will begin; and frequency criteria selection elements from which the user specifies a frequency at which the second unit of work will be executed beginning at the specified time.

13. The method of claim 12, wherein determining system availability to execute the first and second units of work, respectively, comprises accessing a query scheduling having entries defined for respective units of work.

14. The method of claim 12, furthet comprising, for each of the first and second sets of user-selectable scheduling options:

receiving a user selection from the respective set of user selectable scheduling options;

storing a schedule for the respective unit of work on the basis of the user selection; and repetitively executing the respective unit of work on the basis of the schedule.

15. The method of claim 12, wherein determining the first and second costs to execute the first and second units of work comprises estimating a respective time required to execute the respective unit of work.

16. The method of claim 12, wherein determining the first and second costs to execute the first and second units of work is done on the basis of historical query execution times for previous executions of the respective unit of work.

17. The computer-implemented method of claim 12, wherein:

the first cost to execute the first unit of work is higher than the second cost to execute the second unit of work; and the first set of user-selectable scheduling options is less than the second set of user-selectable scheduling options.

\* \* \* \* \*